F. T. GOTTSCHALK.
DRIVING AND BRAKE CLUTCH.
APPLICATION FILED DEC. 1, 1904.

939,411.

Patented Nov. 9, 1909.

Witnesses:
Thomas Durant
M. W. Church

Inventor:
Friedrich T. Gottschalk
by Church & Church
his Attys.

UNITED STATES PATENT OFFICE.

FRIEDRICH THEODOR GOTTSCHALK, OF DRESDEN, GERMANY.

DRIVING AND BRAKE CLUTCH.

939,411. Specification of Letters Patent. Patented Nov. 9, 1909.

Application filed December 1, 1904. Serial No. 235,060.

*To all whom it may concern:*

Be it known that I, FRIEDRICH THEODOR GOTTSCHALK, a subject of the King of Saxony, and residing at Dresden N., Saxony, Empire of Germany, have invented certain new and useful Improvements in Driving and Brake Clutches, of which the following is a specification.

This invention relates to a clutch driving and braking mechanism which is particularly applicable to cycles, whereby, during the forward pedaling or rotary movement the driven part is caused to rotate by a longitudinally adjustable cone which is automatically pressed against the driven part by screw action.

The invention consists in the arrangement of the brake in such manner that, during back pedaling or rotation the clutch cone pushes non-rotatable brake wedges between the driven part and a fixed abutment, said wedges being positively withdrawn during the forward motion, to which end the brake wedges are connected with the clutch cone so as to participate in its longitudinal movement.

Figure 1:
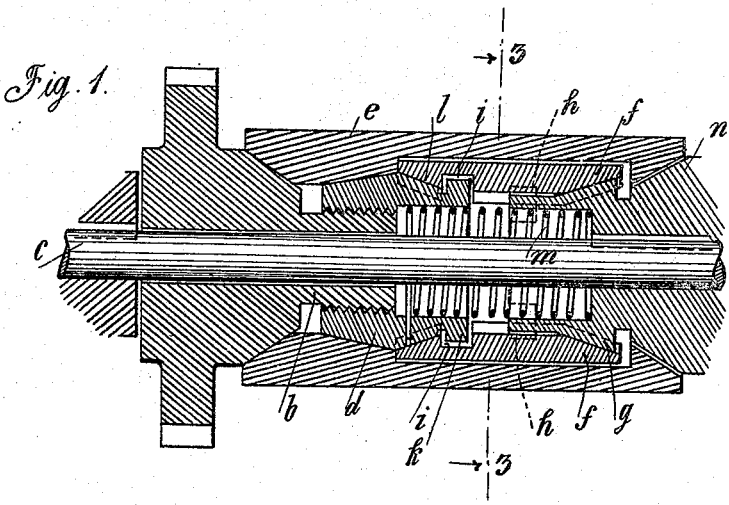
Figure 2:
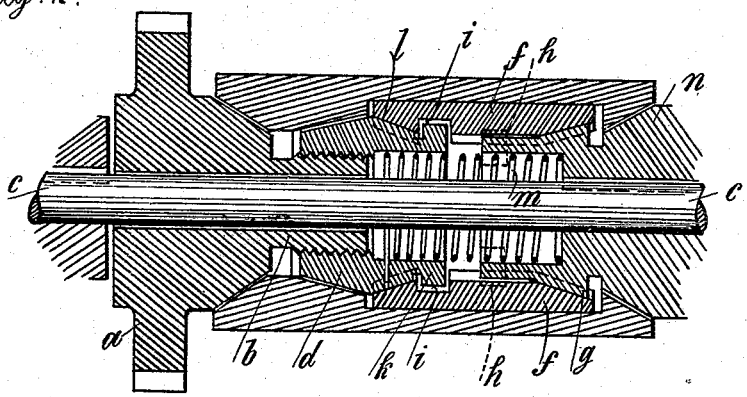
Figure 3:
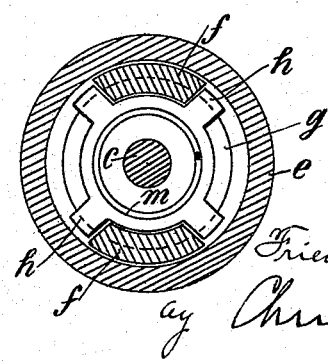

A construction of the clutch mechanism according to this invention is illustrated, by way of example, in the accompanying drawing as applied to a cycle, Figures 1 and 2 being longitudinal sections in driving and braking positions respectively, Fig. 3 being a cross-section on the line 3—3 of Fig. 1.

About the fixed spindle $c$ rotates the wheel $a$ which has a screw-threaded extension $b$, constituting the driving part. The hub $e$, constituting the driven part is freely rotatable on the conical part of the wheel $a$ and on a counter-cone $n$ keyed or otherwise secured to the spindle $c$. The hub is caused to participate in the rotation during forward pedaling owing to a clutch cone $d$ mounted on the extension $b$ becoming screwed up on the part $b$ at the beginning of the forward rotation of the driving part, and thus engaging against the corresponding conical surface of the hub $e$. The cone $d$ is unscrewed and released when the driving part begins to rotate in the opposite direction or is held stationary, the driven part continuing to rotate in the same direction as before. If the driving part continues to rotate backward, or if the driving part is rotated backward after the clutch has been uncoupled, the brake is applied to the driven part. This is effected according to this invention by brake wedges $f$ which, as will be seen in Fig. 3, are guided, so that they cannot rotate, with their inner wedge surfaces between longitudinal ribs $h$ on the conical abutment $g$ which is secured to the cone $n$. In the construction illustrated, the front ends of the brake wedges are also provided with wedge shaped surfaces with which they rest on the conical surface $l$ of the cone $d$. As shown in the drawing the front and the back wedge surfaces are formed in opposite directions. When the released cone $d$ moves, during back pedaling, toward the right, the brake wedges $f$ are at the same time moved both longitudinally and radially by the engagement of the wedge surface $l$ with the cone $d$. The brake wedges, which are thus pushed outward while maintained parallel to themselves, press on the one hand against the inner surface of the hub $e$ and, on the other hand, against the conical abutment $g$ and the wedge surface $l$, and thus stop the hub $e$.

The positive release of the brake wedges on the resumption of pedaling is effected by the engagement of a ring or collar $k$ on the double cone $d$ with grooves $i$ in the wedges $f$, whereby the wedges are longitudinally shifted when the cone $d$ moves to the left. The grooves are preferably made so as to afford a slight clearance for the ring or collar, in order that during the return of the cone $d$ the wedge surface $l$ should be slightly freed before the collar $k$ becomes operative as a driver; whereupon the other ends of the brake wedges are released from frictional engagement with the counter cone $g$. A spring $m$ secured with its left hand end to the cone $d$ is rotatable, with a certain amount of friction, with its rear end in a recess in the abutment or counter cone $g$, for the purpose of preventing the cone from being rotated by the screw thread when, during the passage of the cone from one position to the other, the cone surface $l$ has been released, but the coupling cone surface has not yet come into engagement or turned.

The construction described can be modified by effecting the braking by a purely longitudinal movement of the brake wedges. This would be the case, for instance, if the abutment $g$ were made cylindrical, instead of conical, and the brake wedges pressed with outwardly directed wedge surfaces against the conical inner surface of the driven part. The conical surface $l$ and the corresponding wedge surface of the brake wedge would, of course, be dispensed with on such construction; it can, however, be done away with even when the movement of the brake wedges is not a purely longitudinal one. The drivers $k$ $i$ would then effect both the locking of the wedges and their release.

This invention can be used for many purposes, when its parts are suitably formed and arranged, but it is chiefly intended in its application as a free wheel clutch with back pedaling brake action for cycles, $a$ being the rear sprocket wheel and $e$ the hub of the rear wheel. When the sprocket wheel is held stationary the cone $d$ is rotated by the rotating hub $e$ in the direction of the release, until the coupling has been released. Then free wheeling takes place, followed on backward rotation of the sprocket wheel by a further shifting of the cone in the same direction with the consequent application of the brake.

What I claim as my invention and desire to secure by Letters Patent is:—

1. A driving and braking clutch mechanism comprising a driving member, a driven member, a longitudinally movable cone screwed on one member, an opposed fixed cone and an intermediate wedge member, whereby the movable cone can be moved toward the other to force the wedge member outward on their conical surfaces and a coiled spring attached at one end to the longitudinally movable cone and engaging frictionally at its other end with the other cone substantially as set forth.

2. A driving and braking clutch mechanism comprising a driving member, a driven member a longitudinally movable cone screwed on one member, an opposed fixed cone a non-rotatable double wedge member between the two cones and within the driven member and a coiled spring attached at one end to the longitudinally movable cone and engaging frictionally at its other end with the other cone substantially as set forth.

3. A driving and braking clutch mechanism comprising a driving member, a driven member a screwed extension on the driving member, a longitudinally movable cone on said screwed extension, an opposed cone, an intermediate wedge between the two cones and within the driven member, an engaging lug on the longitudinally movable cone, a corresponding recess in the wedge, and a coiled spring attached at one end to the longitudinally movable cone and engaging frictionally at its other end with the other cone substantially as set forth.

4. A driving and braking clutch mechanism comprising a driving member, a cone longitudinally movable on said member an opposed stationary cone a double-wedge member intermediate the two cones, a lug on one cone member, a corresponding recess in the intermediate double-wedge member, guides on the fixed cone to prevent rotation of the wedge, a tubular driven member surrounding the cones and wedge and a coiled spring attached at one end to one cone and engaging frictionally with the other cone substantially as set forth.

In testimony whereof I have signed my name to this specification in the presence of two subscribing witnesses.

FRIEDRICH THEODOR GOTTSCHALK.

Witnesses:
 CARL GRALARB,
 OTTO WOLF.